July 21, 1970 D. C. GUNDERSON 3,521,238

MULTI-PROCESSOR COMPUTING APPARATUS

Filed July 13, 1967 4 Sheets-Sheet 1

INVENTOR.
DALE C. GUNDERSON

BY Bruce C Lutz
ATTORNEY

INVENTOR.
DALE C. GUNDERSON

BY

ATTORNEY

July 21, 1970 D. C. GUNDERSON 3,521,238

MULTI-PROCESSOR COMPUTING APPARATUS

Filed July 13, 1967 4 Sheets-Sheet 3

INVENTOR.
DALE C. GUNDERSON

BY Bruce C Lutz

ATTORNEY

MULTI-PROCESSOR COMPUTING APPARATUS

INVENTOR.
DALE C. GUNDERSON

BY Bruce C Lutz

ATTORNEY

United States Patent Office 3,521,238
Patented July 21, 1970

3,521,238

MULTI-PROCESSOR COMPUTING APPARATUS

Dale C. Gunderson, Minneapolis, Minn., assignor to Honeywell Inc., Minneapolis, Minn., a corporation of Delaware Filed July 13, 1967, Ser. No. 653,263
Int. Cl. G06f *15/16*
U.S. Cl. 340—172.5 14 Claims

ABSTRACT OF THE DISCLOSURE

A multi-processor computing system is shown wherein each processor has access to a central memory independent of the other processors. The system memory may be either location addressable or content addressable (associative).

The invention described herein was made in the performance of work under a NASA contract and is subject to the provisions of Section 305 of the National Aeronautics and Space Act of 1958, Public Law 85–568 (72 Stat. 435; 42 U.S.C. 2457).

SUMMARY OF THE INVENTION

In many applications of computing and data handling systems it is absolutely necessary for the central processor to be reliable. For example, in space applications the failure of the central processor may destroy the usefulness of the entire mission. In other applications the failure of a central processor may shut down the entire system which can be very costly.

In this invention a central memory is provided with a number of processors having access to the memory. Thus, if one processor fails the other processors can absorb its functions. While such multi-processor systems are known in the prior art, the circuitry which interconnects the processors with the memory is usually time-shared which is undesirable from a reliability standpoint. If the interconnecting circuitry fails, all of the processors will be disabled. In a first embodiment of this invention, each processor is given its individual access circuitry so that a failure of any one processor or its associated access circuitry will not prevent the remaining processors from obtaining access to the memory. The memory is organized to read words serially bit-by-bit. Similarly, words are written bit-by-bit. Each processor is provided with one input gate and one output gate per word. When an output gate is enabled, the memory word corresponding to the enabled gate is read into the processor. Similarly, when an input gate is enabled, the memory word corresponding to the enabled gate is written into.

In the first embodiment of this invention the input and output gates are addressable by the processor so that the memory is location addressable. In a second embodiment the output gates control themselves in accordance with a search word so that the memory is content addressable or associative.

A content addressable or associative memory is one in which a search word is placed in a particular register called the search register and the words stored in the memory are compared to the search word. Words which have certain characteristics with respect to the search word are the addressed words which are to be written into or read from the memory. Associative memories can be organized to provide an "equality" search where all of the words in memory equal to the search word are located, a "greater than" search where all of the words in the memory greater than the search word are located, a "less than" search where all of the words in the memory less than the search word are located, a "maximum" search where the largest word in the memory is located, and a "minimum" search where the smallest word in the memory is located. Searches can be formed over the entire word or over a field or certain designated bits of the memory word.

As an elementary example, assume that a personnel file is stored in the memory with each word of the memory corresponding to one person. Assume that the first six bits of each word correspond to the person's name and the next six bits correspond to the person's age with the remaining bits corresponding to other factors. Assume that it is desired to locate all of the persons of a given age. A six-bit search word is constructed corresponding to the particular age of interest. The second six bits of each memory word are compared to the search word. Those memory words where the second six bits are equal to the search word correspond to persons of the specified age. Similarly, a "greater than" search can be performed to ascertain all of the persons who are older than a specified age or a "lesser than" search can be performed to ascertain all of those persons who are younger than the specified age. To ascertain the oldest person a "maximum" search is performed. This search can be performed in a number of ways. For example, a search word of all ones can be constructed. The first bit of each memory word is compared to the first bit of the search word and all words where a mismatch occurs are eliminated since a mismatch indicates that the first bit of the memory word is a zero. Then the second bit of the remaining words is compared to the search word. This procedure is repeated until all memory words but one are eliminated. The one remaining word is the maximum word corresponding to the oldest person. The particular manner in which the comparison of bits is made during a search depends upon the particular method used in coding the person's age and on the particular type of search being performed.

In the second embodiment of this invention the access circuitry coupling the processors to the memory is made associative by comparing the output from each gate with a search word in a comparison circuit. If a "match" is obtained a flip-flop corresponding to the particular word is set. The output of the flip-flop controls the input and output gates to write and read.

In another embodiment of this invention the memory is organized as a set of shift registers wherein the words continuously cycle through the shift registers and the access circuitry is distributed throughout the memory. Each processor is given access to each word in the memory by connecting each processor's associated access circuitry between adjacent bits or stages of the shift register. The advantages of this embodiment are that certain memory drivers and gating arrays are eliminated and the access circuitry is distributed uniformly throughout the memory which eliminates conflicts between processors which could occur if two processors attempt to write in the same word at the same time.

Accordingly, it is an object of this invention to provide a highly reliable computing system.

Other objects and advantages of this invention will be evident to those skilled in the art upon a reading of this specification and the appended claims in conjunction with the drawings, of which:

FIG. 1 is a block diagram of a first embodiment of this invention;

FIG. 1' shows a portion of the memory of FIG. 1 in greater detail;

Figure 3:
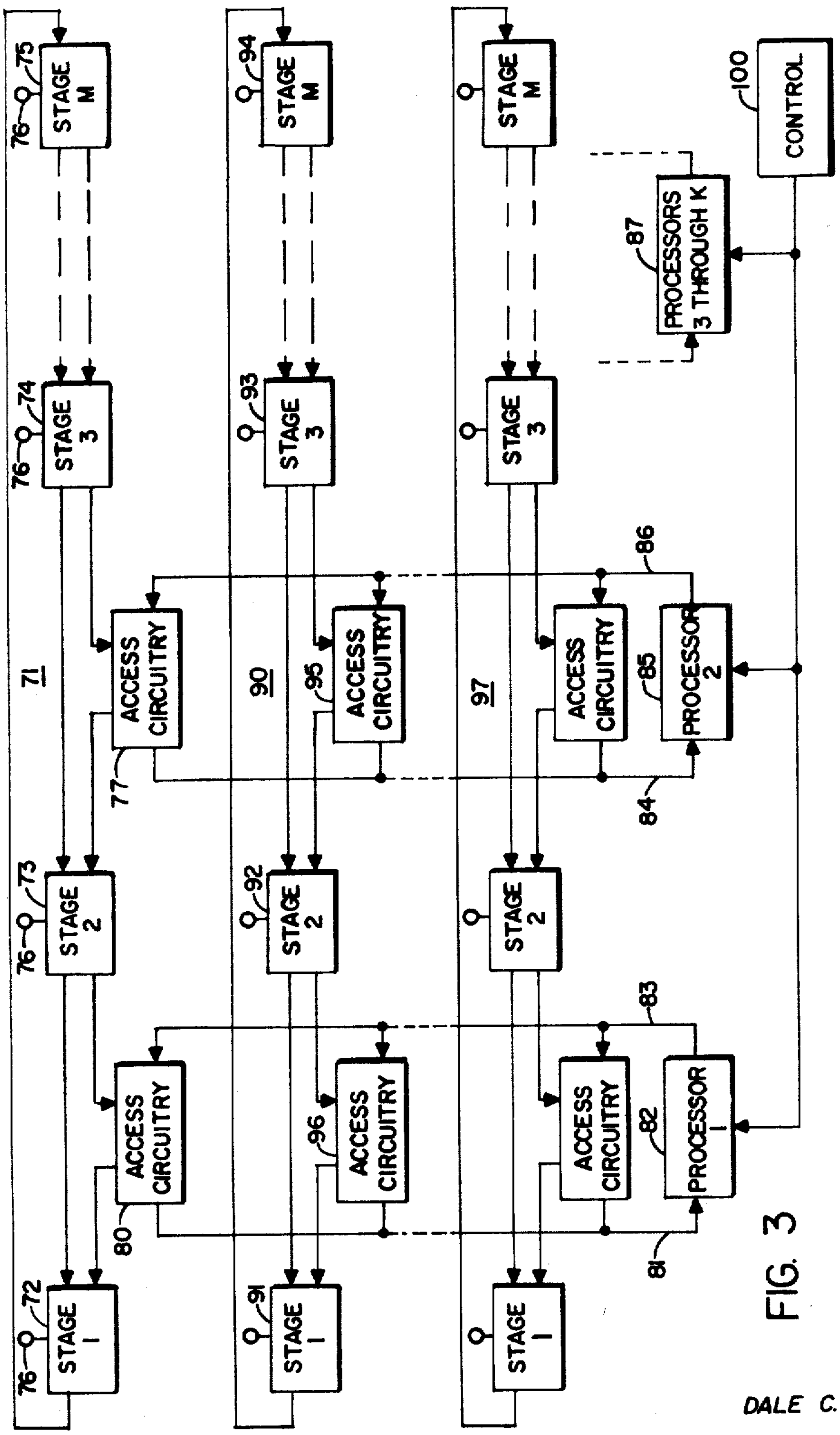
FIG. 3 is a block diagram of a third embodiment of this invention.
Figure 3:
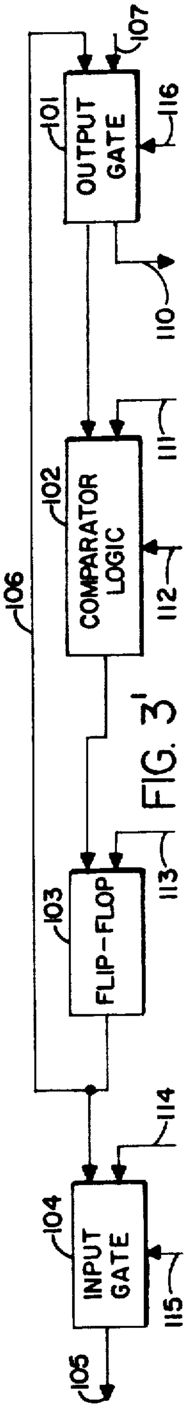

FIG. 3' shows a portion of FIG. 3 in greater detail; and

Figure 4:
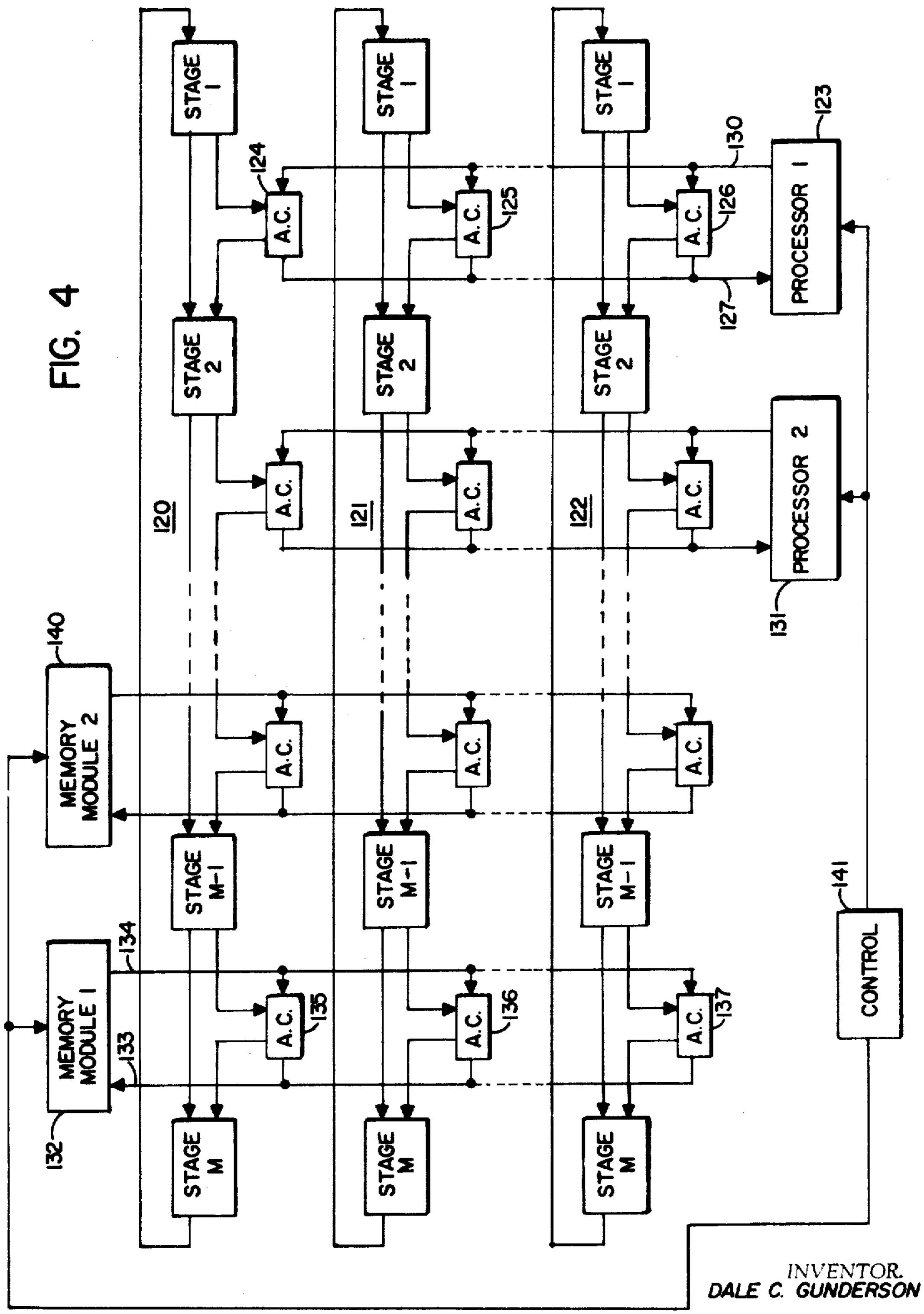

FIG. 4 shows the embodiment of FIG. 3 used to transfer information between processors and memory modules.

FIGURES 1 AND 1'

Figure 1:
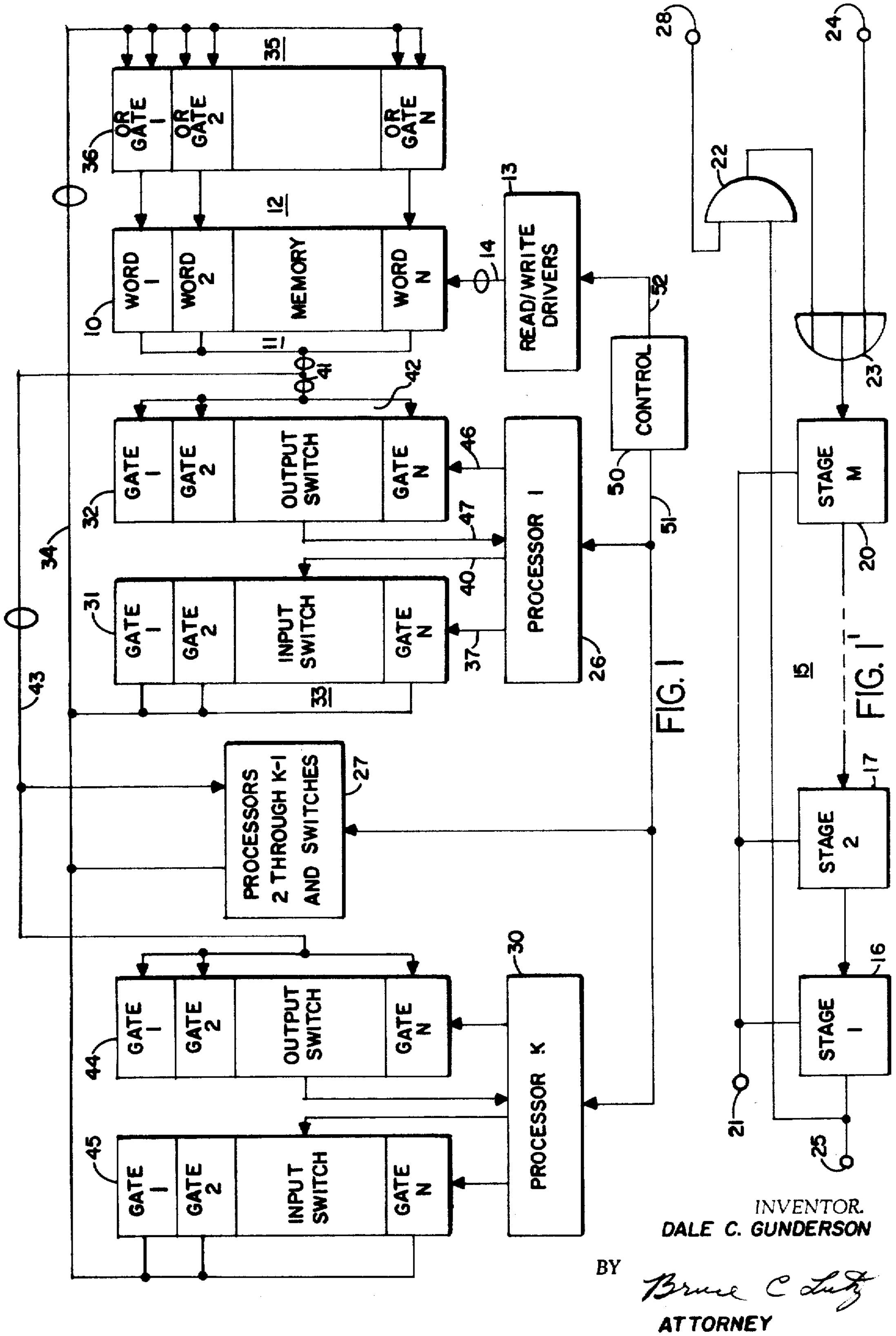

In FIG. 1 there is shown a memory 10 which has a plurality of words from 1 through N. Each word has a plurality of bits from 1 through M. Each word of the memory can be either read or written serially bit-by-bit. Memory 10 has a set of output means 11. Output means 11 has one output conductor for each word. Memory 10 also has a set of input means 12. One input conductor of input means 12 is connected to each of the N words in memory 10. Associated with memory 10 is a set of read/write drivers 13 which are connected to memory 10 by a set of conductors 14. For the purposes of this specification, a set of conductors may be shown as a single conductor enclosed in an ellipse.

Memory 10 may be a plated wire memory similar to that shown in an article by I. Danylchuk, A. J. Perneski, and M. W. Sagal, "Plated Wire Magnetic Film Memories," 1964 Proceedings of the International Conference on Non-linear Magnetics, April 1964, pp. 5–4–1 to 5–4–6. In a plated wire memory the bit information is stored by polarizing thin film magnetic material plated on a conducting wire. Solenoid windings are placed perpendicular to the plated wire. The solenoid winding is pulsed by a driver which partially rotates the magnetic vector of each bit along the winding. This partial rotation of the magnetic vector induces a signal on the plated conductors which is of one polarity when a "0" is stored in the magnetic material adjacent to the solenoid winding and is of the other polarity when a "1" is stored. Bits are written into the memory by pulsing the solenoid winding and simultaneously pulsing the plated conductors. The current in the solenoid winding is not sufficient to reverse the direction of polarization of the bits, but when this current is coupled with the current in the plated conductor, the direction of polarization of the bits can be reversed. The direction of the current pulse applied to the plated conductor determines whether a "0" or "1" is written.

It was explained above that words are read from the memory serially bit-by-bit. Accordingly, when plated wire is used for memory 10, each plated conductor corresponds to one word and the solenoid windings each correspond to one bit of each word. Drivers 13 sequentially pulse the solenoid windings. When each winding is pulsed, output signals appear at each of outputs 11 which are indicative of the bit information stored along the solenoid winding which was pulsed. Thus, each time a solenoid winding is pulsed one bit of each word is presented at output means 11. Each output signal is either a "1" or a "0."

Information is written into memory 10 by supplying signals at input means 12. If a particular word is being written, the bit information is serially presented at the input of inputs 12 which corresponds to the word being written into. As drivers 13 sequentially pulse the solenoid windings, the input bit information causes the solenoid winding to be driven either positive or negative depending upon whether a "1" or a "0" is being written into the particular memory location.

Memory 10 can also consist of shift registers with one shift register corresponding to each word. FIG. 1' shows a shift register 15 which would be used as one word of memory 10. Shift register 15 has stages 16, 17, and 20. An arbitrary number of stages 3 to M–1 can be inserted between stages 17 and 20. Stage 16 corresponds to bit 1 of the word and stage 17 corresponds to bit 2. Stage 20 corresponds to bit M or the last bit of the word. Each stage of shaft register 15 has an output connected to an input of the next succeeding stage. An input terminal 21 is connected to each of the shift register stages. Clock pulses are applied to terminal 21 such that each clock pulse causes shift register 15 to shift the information stored therein one stage to the left. The output of stage

16 is coupled to a first input of a gate 22 which has an output coupled to an OR gate 23. The output of OR gate 23 is coupled to shift register stage 20. An input terminal 24 is connected to a second input of gate 23 and an input terminal 28 is connected to a second input of gate 22. Control signals are applied to terminal 28 to inhibit gate 22 during writing. Input terminal 24 corresponds to one of the inputs 12 of FIG. 1. When no input signals are present at terminal 24, gate 22 is enabled so that the output of shift register stage 16 is coupled through gate 22 and gate 23 to the input of stage 20 to provide an end-around carry. When input information is present at terminal 24, gate 22 is inhibited by a signal at terminal 28 so that the output of stage 16 is decoupled from the input of stage 20. Simultaneously the input signals present at terminal 24 are coupled through gate 23 to stage 20. Thus, as shift register 15 is shifted, the new word is shifted into shift register 15. The output of stage 16 is connected to an output terminal 25 which corresponds to the output of output means 11.

Referring back to FIG. 1 there is shown blocks 26, 27 and 30 which correspond to various computing means or processors. These processors may be any of several types. One example would be the arithmetic unit in FIG. 2 page 655 of the IEEE transactions on Electronic Computers volume EC–12 December 1963. This figure is part of an article on a Swedish computer designated as D21. Block 26 corresponds to a processor 1 and block 30 corresponds to a processor K. Block 27 corresponds to an arbitrary number of processors which can be inserted between processor 1 and processor K. Each processor is connected to memory 10 by substantially identical access circuitry so that only the access circuitry for processor 1 will be described in detail. The access circuitry for processors 2 through K–1 is included in block 27.

Processor 1 has associated therewith an input switch 31 and an output switch 32. The two switches 31 and 32 are comprised of a plurality of AND gates wherein each of gates 1 through gate N is a separate single AND gate of the type found in any logic design sale brochure. The AND gate should provide an output only in the presence of predesignated signals at all of the inputs.

If a digital decoder is used within processor 26, the AND gate may have only two inputs. One of the inputs would be from the corresponding memory word and the other would be from processor 26. On the other hand, the AND gate may have a plurality of inputs from processor 26 and a single input from the memory 10 so that the AND gate per se acts as the decoder. Input switch 31 includes a plurality of input gates 1 through N with one gate corresponding to each word of memory 10. The input gates of switch 31 have a set of outputs 33 with one output from each gate. Outputs 33 are connected by means of a set of conductors 34 to a set of input means 35 of a set of OR gates 36. Gate 1 in switch 31 is connected to OR gate 1 of OR gates 36 and the output of OR gate 1 is connected to the input of word 1 of memory 10. Similarly, the output of gate 2 of switch 31 is connected to the input of OR gate 2 of OR gates 36 which has an output connected to the input of word 2 of memory 10. Each gate of switch 31 is similarly connected to a corresponding OR gate of OR gates 36 and the output of each OR gate is connected to the corresponding memory word. Processor 1 supplies address signals or codes to switch 31 over a conductor 37 and supplies input information, data, or words over a conductor 40.

Switch 32 includes a plurality of output gates with each gate corresponding to one word of memory 10. Output means 11 of memory 10 is connected by a conductor or set of conductors 41 to a set of input means 42 of switch 32. The output of word 1 of memory 10 is connected to the input of gate 1 of switch 32. Similarly, the output of word 2 is connected to the input of gate 2, etc.

Output 11 of memory 10 is connected by a set of conductors 43 to output switches of the other processors which correspond to the output switch 32 of processor 1. For example, processor K has an output switch 44 associated therewith which is connected to the set of conductors 43. Similarly, each processor has an input switch corresponding to input switch 31 which is connected by means of the set of conductors 34 to the inputs 35 of OR gates 36. For example, processor K has an input switch 45 which includes a set of gates which are each connected to one of the set of OR gates 36. OR gates 36 couple the corresponding input gate of each processor to the input of the corresponding word of memory 10.

Processor 1 supplies address signals or codes to output switch 32 over a conductor 46 and receives information, data, or words from output switch 32 over conductor 47.

A control 50 has an output 51 connected to each of processors 1 through K and an output 52 connected to drivers 13. Control 50 provides timing signals so that information is read from or written into memory 10 at the appropriate times. Control 50 may be any type of clock or other device for producing timing signal such as a pulse producing oscillator. One such usable example would be a 100 series model 402 clock from Digital Equipment Corporation.

Assume that processor 1 is to read word 1 of memory 10. Processor 1 provides the address of word 1 to switch 32. Switch 32 decodes the address to enable gate 1 which then connects the output of word 1 to conductor 47. As drivers 13 sequentially pulse the solenoid windings (in a plated wire memory) or clock the shift registers, the bits of word 1 are sequentially transmitted to processor 1 over conductors 41 and 47. It is evident that more than one processor can read the same word at the same time. For example, processor K could also energize gate 1 of its output switch 44 to read word 1 while processor 1 is reading word 1. If it is desired to read a different word from memory 10 into processor 1, the address of the appropriate word is supplied on conductor 46 to enable the appropriate gate of output switch 32 in the same way that gate 1 was enabled to read word 1. It is evident that since each processor has access to each memory word, the processors can simultaneously read any desired word or words.

To write information into memory 10 from processor 1, processor 1 supplies the address of the word to be written on conductor 37. The address is decoded by input switch 31 to enable the corresponding gate. The word to be written is clocked out of processor 1 on conductor 40, passed through the enabled gate of input switch 32, and passed through the corresponding OR gate of OR gates 36 to the input of the word of memory 10 which is to be written. For example, to write into word 1 of memory 10, processor 1 provides the address of word 1 on conductor 37 which enables gate 1. The information or word to be written is serially provided on conductor 40 and passes through gate 1 of switch 31 and OR gate 1 of OR gates 36 to the input of word 1. When the shift register memory of FIG. 1' is used additional conductors and OR gates 36 must be used to provide the control signals to terminal 28.

As was noted hereinbefore, it is an advantage of this invention that if a portion of the memory fails, the remainder of the memory can still be utilized by all processors. If the access circuitry or a portion of the access circuitry of a processor fails, other processors can be programmed to absorb the functions of the inoperative processor.

FIGURE 2

Figure 2:
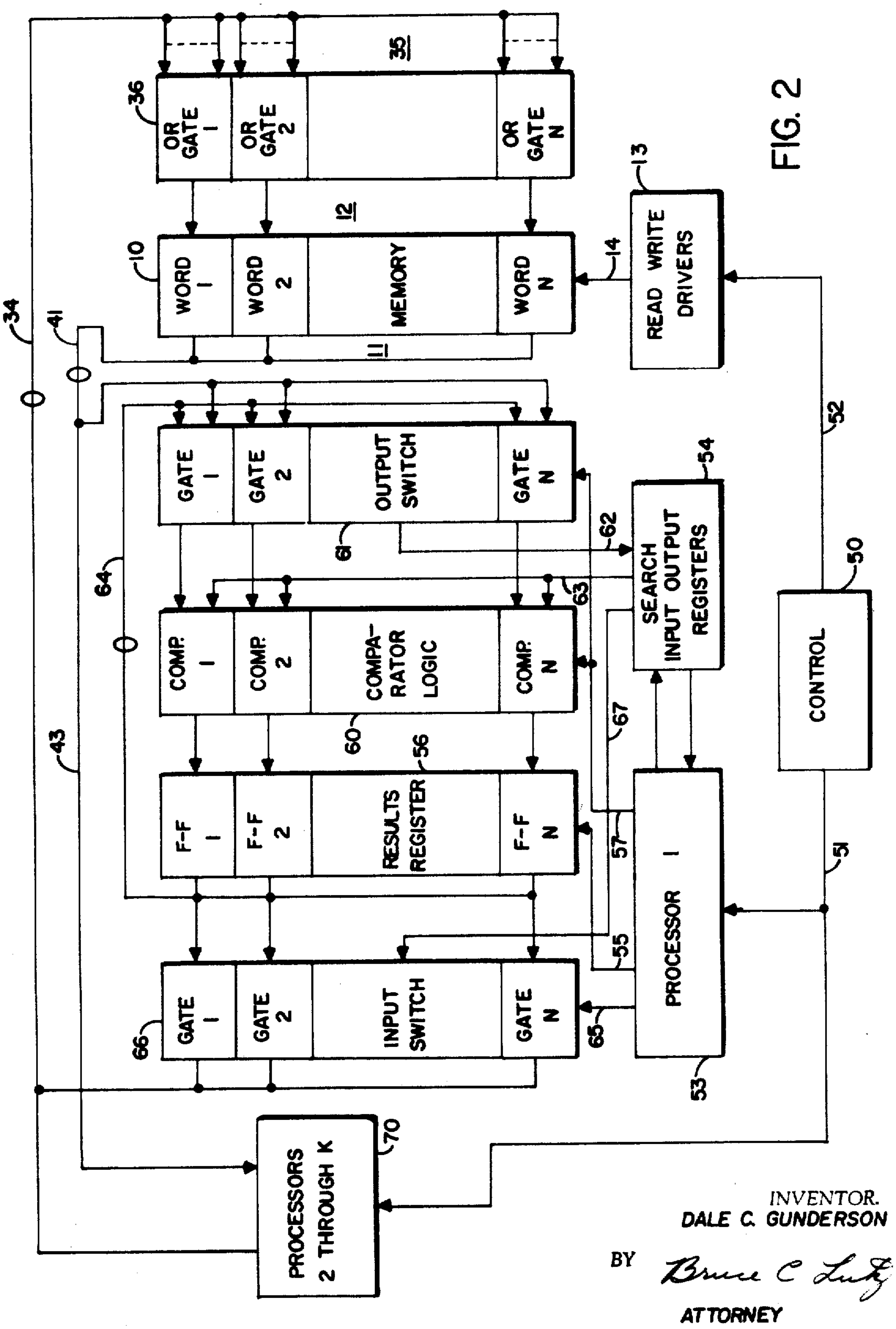
FIG. 2 is a block diagram of a second embodiment of this invention.

FIG. 2 shows a second embodiment of this invention similar to FIG. 1 but wherein the memory is made content addressable or associative. The components which make the memory associative are generally included within the access circuitry. Memory 10, drivers 13, OR gates 36, and control 50 together with their associated connections are the same in FIG. 2 as in FIG. 1. Accordingly, these portions of the structure of FIG. 2 will not be explained in detail.

There is shown in FIG. 2 a block 53 labeled processor 1 which is generally similar to the processors of FIG. 1. Processor 1 is connected to a block 54 labeled search input/output registers. Block 54 contains registers which under the control of processor 1 hold the search word, receive data from memory 10, and transmit data to memory 10. Processor 1 is further connected by a conductor 55 to a results register 56. Results register 56 includes a set of sensing means or flip-flops 1 through N or similar devices. The search register 54 is merely a shift register for recirculating any given word upon command by processor 53. One such example of a usable shift register may be found in FIG. 7.23 on page 203 of the seventh edition of the General Electric Transistor Manual. Processor 1 is further connected by means of a conductor 57 to a comparing means, comparison means, comparator logic, or set of comparators 60 and to an output means or output switch 61. Each of the comparators in comparator logic block 60 may comprise any of a plurality of various circuits for comparing a memory word gated through switch 61 with the word being supplied to the comparator from the search register 54. A specific workable example may be found in a book entitled Switching Circuits for Engineers, by Mitchell P. Markous. The book was published by Prentice Hall in 1962 with the third printing in 1964. The circuit may be found in FIGS. 3–24 on page 42. Comparator logic 60 includes a set of comparators 1 through N. The output of each comparator is connected to an input of a corresponding flip-flop of results register 56. Output switch 61 includes a set of gates 1 through N similar to the gates of the output switches of FIG. 1. Each gate in switch 61 has an output connected to an input of the corresponding comparator of comparator logic 60. Switch 61 has a data output means connected by means of a conductor 62 to an output register in block 54. The search register in block 54 has an output connected by a conductor 63 to the various comparators in comparator logic 60. The output of each flip-flop in the results register 56 is connected by means of a set of conductors 64 to inputs of the corresponding gates of switch 61.

An output 65 of processor 1 is connected to an input means or input switch 66. The switches 61 and 66 may be a plurality of AND gates such as described in connection with switches 31 and 32. An input register in block 54 is connected by means of a conductor 67 to input switch 66. Input switch 66 includes a set of gates 1 through N similar to the gates in the input switches of FIG. 1. An output of each flip-flop in the results register 56 is connected to an input of the corresponding gate of input switch 66. In general, there is one output gate in switch 61, one comparator in comparator logic 60, one flip-flop in results register 56, and one input gate in switch 66 for each word in memory 10. Output means 11 of memory 10 is connected by conductors 41 to inputs of switch 61 such that the output of each word in memory 10 is connected to the input of one gate in switch 61. Similarly, the outputs of the gates of switch 66 are connected by conductors 34 to input means 35 of OR gates 36. Control 50 is connected by means of conductor 51 to an input of processor 1 and further connected to an input of a block 70 labeled processors 2 through K. Block 70 is also connected to conductors 43 and 34. Block 70 contains an arbitrary number of processors together with associated access circuitry similar to processor 1 and its associated access circuitry.

To explain the operation of FIG. 2, it will first be assumed that an equality search is to be made. Processor 1 transmits a signal over conductor 55 to results register 56 to set all of the flip-flops in results register 56 to their "1" states. The search word is transmitted to the search register in block 54. Next, processor 1 provides a signal on conductor 57 which enables comparator logic 60 and output switch 61. This signal is provided at the appropriate time so that the comparison is made only over the bits of interest in the words stored in memory 10. Simultaneously, the search register transmits the search word serially bit-by-bit to each comparator of comparator logic 60. The output bits of the memory words are applied serially to the gates of output switch 61 and are passed through the gates to inputs of the comparators.

The comparators in comparator logic 60 compare the bits of the search word to the bits from each of the memory words. When a mismatch occurs between the search word and one of the memory words, the corresponding comparator provides an output signal to set the corresponding flip-flop in results register 56 to a "0" state. The "0" output of the flip-flop is coupled back to an input of the corresponding output gate in switch 61 to inhibit that output switch so that no more bits of that memory word are compared. Obviously, when a particular bit of the search word is not the same as the corresponding bit in the memory word, there can be no equality. After all of the bits of interest (which is called the field of interest) have been read, processor 1 inhibits comparator logic 60 and switch 61 so that no further bits of the memory words are read.

Once a comparison has been completed, only those flip-flops of the results register where a match occurred will be in their "1" states. Assume that only flip-flop 2 in results register 56 is in its "1" state. All of the gates in switch 61 will be inhibited except gate 2. During the next succeeding memory cycle, processor 1 will enable output switch 61 so that gate 2 will read word 2 and will transmit the bits of word 2 over conductor 62 to the output register.

In most cases multiple matches will not occur; however, if multiple matches do occur, switch 61 can be designed to read each of the words sequentially. The words can be read sequentially simply by gating the outputs of the flip-flops in the results register 56 such that if flip-flop 1 is in its "1" state word 1 is read first, but if it is in its "0" state, word 2 is read first, etc. After each word has been read, the corresponding flip-flop is set to zero so that the next word is read.

When a "greater than" or "less than" search is being performed, the operation of FIG. 2 is essentially the same as for an "equality" search. For example, assume that it is desired to locate the words in memory 10 which are greater than a particular search word. The first bit of the search word is compared to the first bit in the field of interest in each memory word. Assume that the first bit of a search word is a "1." Then each word of which the first bit in the field of interest is a "0" will be less than the search word. Accordingly, the corresponding comparator in comparator logic 60 will provide an output signal which sets the corresponding flip-flop of results register 56 to a "0" thereby ending the comparison between the search word and the corresponding memory word. The second bit of the search word will then be compared to the second bit of each of those memory words which had a "1" as the first bit. It is evident that in an inequality search the highest order bit position where a mismatch occurs between the memory word and the search word is determinative of which word is larger. If the search word contains a "0" in the highest order position where a mismatch occurs and the memory word contains a "1," the memory word is larger. If the converse is true, the search word is larger. Thus, each comparator in comparator logic 60 must make a determination when the first mismatch occurs.

If there is a mismatch and the search word is a "1," the particular comparator provides an output signal to set the corresponding flip-flop to its "0" state thereby ending the comparison. If the search word contains a "0" bit in the highest order position where a mismatch occurs, it means that the memory word is larger. As it is desired to leave the corresponding flip-flop in results register 56 in its "1" state, a provision must be made in the comparators such that results of successive comparisons will not affect the corresponding flip-flops in results register 56. This provision can be made by providing each comparator with an internal flip-flop which is set whenever the memory word is smaller than the search word. The output of this flip-flop can be used to inhibit the comparator during the remainder of the memory cycle. The internal flip-flop would be reset by the enable signal on conductor 57.

From the above description for a "greater than" search, the method for performing a "lesser than" search is obvious. A maximum search is performed by using a search word consisting of all ones. The most significant bit of each memory word is compared to the first bit of the search word. Each word where a mismatch occurs contains a "0" in the most significant bit position. The corresponding flip-flops are set to their "0" states to inhibit further searching of those words. The remaining bits are successively compared until only one flip-flop remains in its "1" state. The corresponding word is the largest word. A provision must be made for sensing when there is only one flip-flop in its "1" state. Such a provision is not shown in FIG. 2. A minimum search is performed in a similar manner except that the search word is all zeros.

In writing information into an associative memory, the memory location which is to be written into must first be ascertained. The memory location is ascertained by searching the memory with an appropriate search word. At the end of this search one or more of the flip-flops in the results register 56 will be in their "1" state. When a particular flip-flop is in its "1" state, its output enables the input gate connected thereto. At the end of this search processor 1 provides a signal on conductor 65 to enable switch 66. During the next succeeding memory cycle the word to be written is supplied serially bit-by-bit on conductor 67. The bits of this word are transmitted by the enabled input gates to the corresponding OR gates 36.

FIGURES 3 AND 3′

In the embodiment shown in FIG. 3 the shift register implementation of the memory must be used. The memory can be either location addressable or content addressable. The main difference between FIG. 3 and FIGS. 1 and 2 is that in FIG. 3 the access circuitry for each processor is distributed between columns of bits in the memory. Each column of bits is called a bit slice. Thus, each processor is connected between adjacent bit slices.

In FIG. 3 there is shown a first shift register 71 which has a plurality of stages corresponding to the various bits of a first word stored in the memory. There is shown a first stage 72, a second stage 73, a third stage 74, and an Mth stage 75. An arbitrary number of stages may be inserted between stage 75 and stage 74. An output of stage 74 is connected to an input of stage 73, an output of stage 73 is connected to an input of stage 72, and an output of stage 72 is connected to an input of stage 75. An output of stage 75 is connected to an input of the next succeeding stage and an output of the fourth stage is connected to an input of stage 74. Each of stages 72–75 has a clock terminal 76 connected thereto. Clock pulses applied to terminal 76 cause the word stored in register 71 to shift to the left one bit position for each clock pulse. Since stage 72 is connected to stage 75 there is an end-around carry.

An output of stage 74 is connected to an input of access circuitry 77 which has an output connected to an input of stage 73. An output of stage 73 is connected to an input of access circuitry 80 which has an output connected to an input of stage 72. Access circuitry 80 has an output connected by means of a conductor or set of conductors 81 to an input of a block 82 labeled processor 1. Processor 1 has an output connected by means of a conductor or set of conductors 83 to an input of access circuitry 80. Access circuitry 77 has an output connected by means of a conductor or set of conductors 84 to a block 85 labeled processor 2. Processor 2 has an output connected by means of a conductor or set of ocnductors 86 to access circuitry 77. A block 87 labeled processors 3 through K is shown with dashed lines connected thereto. Block 87 contains an arbitrary number of processors. The access circuitry associated with block 87 would be connected between higher order stages of the shift registers.

There is shown a shift register 90 which is similar to shift register 71. Shift register 90 has a first stage 91, a second stage 92, a third stage 93, and an Mth stage 94 which corresponds to stages 72–75, respectively of shift register 71. Stages 91–94 are connected together in the same manner as the stages of shift register 71. An output of stage 93 is connected to an input of access circuitry 95 which has an output connected to an input of stage 92. Access circuitry 95 has an output connected to conductors 84 and an input connected to conductors 86 which connect access circuitry 95 to processor 2. Stage 92 has an output connected to an input of access circuitry 96 which has an output connected to an input of stage 91. An output of access circuitry 96 is connected to conductors 81 and an input of access circuitry 96 is connected to conductors 83 to connect access circuitry 96 to processor 1. On Nth shift register 97 is shown with M stages equivalent to the stages of shift registers 71 and 90. Access circuitry is associated with shift register 97 which gives processors 1 and 2 access to information stored in shift register 97. An arbitrary number of shift registers may be inserted between shift registers 90 and 97. A control 100 is connected to each of the processors. Control 100 operates synchronously with the clock pulses applied at terminal 76.

Assume first that the computing system shown in FIG. 3 is location addressable. The access circuitry associated with each processor is similar to the access circuitry associated with each processor in FIG. 1. For example, access circuitry 80 includes gate 1 of switch 32 and gate 1 of switch 31. Access circuitry 96 similarly includes an input gate and an output gate so that the word represented by shift register 90 can be read. Address decoding circuitry is also associated with access circuitry 80 and 96 so that processor 1 can address the specific word to be read or written. Note that each processor operates out-of-phase with every other processor. This out-of-phase operation is an advantage since processor 2 can utilize access circuitry 77 to write into shift register 71, and at the same time processor 1 can read shift register 71 through access circuitry 80. Thus, information would be transferred from processor 2 to pocessor 1 with only one bit-time delay while the information is preserved for future use in shift register 71.

One advantage of the embodiment shown in FIG. 3 over those shown in FIGS. 1 and 2 is that in FIGS. 1 and 2 if two processors attempt to write into the same word at the same time, the information of both processors will probably be destroyed. In the embodiment of FIG. 3 the conflict of two processors attempting to write the same word at the same time can more easily be avoided since processors are one or more bit times out of phase.

The embodiment of FIG. 3 can be made content addressable or associative by using the access circuitry of FIG. 3′. In FIG. 3′ there is shown an output gate 101 with a first output connected to a comparator or comparator logic 102. Comparator logic 102 has an output connected to a flip-flop 103 which has an output connected to an input gate 104. Input gate 104 has an output connected to a conductor 105. The output of flip-flop 103 is also connected to an input of gate 101 by a conductor 106. An input conductor 107 is connected to a second input of gate 101. Gate 101 has a second output connected to a conductor 110. Conductors 111 and 112 are connected to second and third inputs of comparator logic 102. A conductor 113 is connected to a second input of flip-flop 103. A conductor 114 is connected to a second input of gate 104 and a conductor 115 is connected to a third input of gate 104. A conductor 116 is connected to a third input of gate 101. The structure of FIG. 3′ corresponds to the associative access circuitry of FIG. 2. Gate 101 corresponds to one of the gates in switch 61 while gate 104 corresponds to one of the gates in switch 66. Flip-flop 103 corresponds to one of the flip-flops in results register 56 while computer logic 102 corresponds to one of the comparators in comparator logic 60. The various conductors of FIG. 3′ correspond to the various conductors associated with the access circuitry of FIG. 2 which enable the various gates and which carry information or data.

The circuitry of FIG. 3′ is incorporated into each access circuitry block of FIG. 3. For example, when the circuitry of FIG. 3′ is incorporated into access circuitry 80, conductor 107 is connected to stage 73 of shift register 71 while conductor 105 is connected to stage 72. Conductors 111–116 would be included within conductors 83 while conductor 110 would correspond to conductors 81. The operation of the associative embodiment of FIG. 3 is substantially the same as operation of the associative embodiment of FIG. 2 and will not be explained in detail.

FIGURE 4

The embodiment of this invention shown in FIG. 4 is substantially the same as the embodiment of the invention shown in FIG. 3 with the access circuitry of FIG. 3′. The embodiment shown in FIG. 4 operates as an associative switch in which the memory is utilized to transfer data between processors and memory modules.

In FIG. 4 there is shown a first shift register 120, a second shift register 121, and an Nth shift register 122. An arbitrary number of shift registers can be inserted between shift registers 121 and 122. Each shift register has M stages. The stages are connected together the same as in FIG. 3. A processor 123 has access circuitry 124, 125, and 126 connected to it by conductors 127 and 130. Access circuitry 124 is connected to the first and second stages of shift register 120, access circuitry 125 is connected to the first and second stages of shift register 121, and access circuitry 126 is connected between the first and second stages of shift register 122. Access circuitry 124–126 is the same as the access circuitry shown in FIG. 3′. A processor 131 has similar access circuitry associated therewith giving processer 131 access to the memory between stages 2 and 3 of each shift register. A memory module 132 has conductors 133 and 134 connected thereto which are further connected to access circuitry 135, 136, and 137. Access circuitry 135 is connected to stage M–1 and stage M of shift register 120; access circuitry 136 is connected to stage M–1 and stage M of shift register 121; and access circuitry 137 is connected to stage M–1 and stage M of shift register 122. A memory module 140 has access circuitry associated therewith giving memory module 140 access to the memory between stages M–1 and M–2 of each shift register. A control 141 has outputs connected to processors 123 and 131 and to memory modules 132 and 140.

To understand the operation of FIG. 4 assume that each shift register has 32 stages. Thus, each stage can contain a 32 bit word. The first bit of each word is a flag bit which indicates whether or not the particular associative memory word is in use or not. For simplicity, assume that each address of words in the memory modules is 12 bits. Bits 2–13 will then contain the address of words in the memory modules and bit 14 will specify whether the word is to be read or written. The 15th bit indicates whether or not a particular operation is complete. The remaining bits of each word contain the data.

Assume that processor 123 is to read a word from memory module 132. Processor 123 first searches the memory to find an associative word which is available for use. The first bit of each word indicates whether the word is available for use or not. When an available word is found, processor 123 sets the first bit to indicate that the particular word is in use and then in the next 12 bits specifies the address of the word to be read and sets the 14th bit to indicate that the addressed word is to be read. The memory modules continuously search the addresses of words in the associative memory. Since the address of the word to be read is within the range of addresses of memory module 132, memory module 132 will find a match. The 14th bit will indicate to memory module 132 that it is to read the particular word which is addressed. Memory module 132 will then read from its memory the addressed word which will be transferred bit-serially to the data field of the associative word. When memory module 132 has completed this transfer it will set the 15th bit to indicate that the read operation is complete. Processor 123 will continuously search the memory until memory module 132 has indicated that the read operation is complete. At that time processor 123 will read the data from the associative memory. Writing is accomplished in the same manner except that the processor specifies the information to be written along with an address and the appropriate memory module transfers the data from the associative word to the specified memory location.

Various other arrangements of the associative word are possible and may be desirable where special situations occur. The number of processors and memory modules which can be used in the structure of FIG. 4 is arbitrary.

While I have shown and described various embodiments of my invention, it will be evident to those skilled in the art that many modifications can be made to the specific embodiments shown. Accordingly, I do not wish to be limited by the specific embodiments shown and described, but wish to be limited only by the scope of the appended claims.

I claim as my invention:

1. A computing system comprising, in combination:
- memory means having input means and output means;
- means connected to said memory means for reading the words stored in said memory means such that each bit of a memory word is sequentially present at said output means;
- a plurality of computing means each having a plurality of input gates and output gates, each input gate of one computing means corresponding to a different word in said memory means and each output gate of one computing means corresponding to different word in said memory means;
- means for connecting each of said input gates to the input means of said memory means so that each input gate controls writing into the corresponding word in said memory means;
- means for connecting the output means of said memory means to each of said output gates so that each output gate controls reading from the corresponding word in said memory means;
- means connected to said input gates for enabling the appropriate ones of said input gates to transmit information from said computing means to the memory words corresponding to the enabled input gates; and
- means connected to said output gates for enabling the appropriate ones of said output gates to transmit information from the memory word corresponding to the enabled output gates to said computing means.

2. A computing system as defined in claim 1 wherein said input gates and said output gates are enabled by an address code from the computing means connected thereto, each different address code corresponding to a particular word.

3. A computing system as defined in claim 2 wherein each word in said memory means is stored in a shift register with a number of stages equal to the number of bits in a word, said output gates of said computing means are connected to the stages of each shift register corresponding to a particular bit of each word, the connection being such that the output gates corresponding to different ones of the plurality of computing means are connected to different shift register stages, and said input gates of each computing means are connected to shift register stages adjacent to the stages to which the output gates of the paritcular computing means are connected.

4. A computing system as defined in claim 1 wherein the means for enabling the output gates includes means for providing a search word, comparing means for comparing the search word to at least a portion of the memory word, sensing means connected to said comparing means, for providing signals indicative of memory words which have particular characteristics with respect to the search word, and means connecting said sensing means to said output gates to enable said output gates to read the memory words which have the particular characteristics.

5. A computing system as defined in claim 4 wherein each word in said memory means is stored in a shift register with a number of stages equal to the number of bits in a word, said output gates of said computing means are connected to the stages of each shift register corresponding to a particular bit of each word, the connection being such that the output gates corresponding to different ones of the plurality of computing means are connected to different shift register stages, and said input gates of each computing means are connected to shift register stages adjacent to the stages to which the output gates of the particular computing means are connected.

6. A computing system as defined in claim 1 wherein each word in said memory means is stored in a shift register with a number of stages equal to the number of bits in a word, said output gates of said computing means are connected to the stages of each shift register corresponding to a particular bit of each word, the connection being such that the output gates corresponding to different ones of the plurality of computing means are connected to different shift register stages, and said input gates of each computing means are connected to shift register stages adjacent to the stages to which the output gates of the particular computing means are connected.

7. Computing apparatus comprising, in combination:
- memory means having a plurality of words, each word having a plurality of bits;
- a plurality of computing means each having a plurality of input gates and a plurality of output gates, each of said gates being associated with one of said words, said output gates for receiving information from said memory means and said input gates for transmitting information to said memory means;
- input means for connecting said input gates to said memory means whereby the information transmitted to said memory means is written into the word associated with the input gate which is transmitting the information;
- output means for connecting said output gates to said memory means whereby each output gate controls reading information from the memory word with which it is associated;
- means connecting to said input gates and said output gates for enabling said input gates to transmit information supplied by said computing means and for enabling said output gates to receive information from the word associated therewith; and control means connected to said memory means for energizing said memory means to sequentially store bits of information transmitted to said input means and to sequentially transmit the bits of each word to said output means.

8. Computing apparatus as defined in claim 7 wherein each of said words is stored in a shift register and each bit is a shift register stage, said control means cycles the information stored in said words by shifting the information stored in said bits sequentially through the shift register, said output gates of each computing means are connected to different bits of each word, and said input gates of each computing means are connected to different bits of each word.

9. Computing apparatus as defined in claim 7 wherein said input gates and said output gates are enabled by signals from said computing means.

10. Computing apparatus as defined in claim 8 wherein said input gates and said output gates are enabled by signals from said computing means.

11. Computing apparatus as defined in claim 7 wherein said means for enabling said input gates and for enabling said output gates includes comparing means, means for supplying a search word connected to said comparing means, means connecting said comparing means to said output gates whereby said comparing means compares said search word to the information stored in said memory means and provides an output signal indicative of information stored in said memory which has a particular characteristic with respect to said search word, and means connecting said comparing means to said output gates whereby the output signals from said comparing means enable said output gates to read the memory words with the particular characteristic and further connecting said comparing means to said input gates whereby the output signals from said comparing means enable said input gates to transmit information from said computing means to the memory words corresponding to the enabled input gates.

12. Computing apparatus as defined in claim 8 wherein said means for enabling said input gates and for enabling said output gates includes comparing means, means for supplying a search word connected to said comparing means, means connecting said comparing means to said output gates whereby said comparing means compares said search word to the information stored in said memory means and provides an output signal indicative of information stored in said memory which has a particular characteristic with respect to said search word, and means connecting said comparing means to said output gates whereby the output signals from said comparing means enable said output gates to read the memory words with the particular characteristic and further connecting said comparing means to said input gates whereby the output signals from said comparing means enable said input gates to transmit information from said computing means to the memory words corresponding to the enabled input gates.

13. Computing apparatus comprising, in combination:

memory means having a plurality of shift registers, each shift register capable of storing one memory word and each stage of each shift register capable of storing one bit;

means connected to said memory means for shifting said shift registers;

a plurality of computing means having input means and output means associated therewith;

means connecting said input means associated with each of said computing means to one stage of each shift register, said input means associated with different computing means being connected to different stages, said input means operating to control the state of the shift register stage connected thereto so that as successive bits are shifted into a shift register stage the input means connected thereto is operable to write a word into memory;

means connecting said output means associated with each of said computing means to one stage of each shift register, said output means associated with different computing means being connected to different stages, said output means operating so that as successive bits are shifted into a shift register stage the output means connected thereto is operable to read a word from memory; and means connected to said input means and to said output means for enabling said input means to write words into particular shift registers and for enabling said output means to read words from particular shift registers.

14. Computing apparatus as defined in claim 13 wherein the means for enabling said input means and said output means includes comparing means, means for supplying a search word connected to said comparing means, means connecting said comparing means to said output means whereby said comparing means compares said search word to the information stored in said memory means and provides an output signal indicative of words contained in said memory which have particular characteristics with respect to said search word, and means connecting said comparing means to said output means whereby the output signals from said comparing means enable said output means to read the memory words with the particular characteristics and further connecting said comparing means to said input means whereby the output signals from said comparing means enable said input means to transmit information from said computing means to the memory words with the particular characteristics.

References Cited

UNITED STATES PATENTS

| | | | |
|---|---|---|---|
| Re. 26,171 | 3/1967 | Falkoff | 340—172.5 |
| 3,200,380 | 8/1965 | MacDonald et al. | 340—172.5 |
| 3,234,518 | 2/1966 | Rakoczi et al. | 340—172.5 |
| 3,242,467 | 3/1966 | Lamy | 340—172.5 |
| 3,247,488 | 4/1966 | Welsh et al. | 340—172.5 |
| 3,274,554 | 9/1966 | Hopper et al. | 340—172.5 |
| 3,274,561 | 9/1966 | Hallman et al. | 340—172.5 |
| 3,312,954 | 4/1967 | Bible et al. | 340—172.5 |
| 3,323,109 | 5/1967 | Hecht et al. | 340—172.5 |
| 3,343,135 | 9/1967 | Freiman et al. | 340—172.5 |

PAUL J. HENON, Primary Examiner